(12) United States Patent
Schmitt

(10) Patent No.: US 10,093,148 B2
(45) Date of Patent: Oct. 9, 2018

(54) NOISE PREVENTION DEVICES FOR HVAC ASSEMBLIES

(71) Applicant: DENSO International America, Inc., Southfield, MI (US)

(72) Inventor: Zachary Schmitt, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 156 days.

(21) Appl. No.: 15/086,781

(22) Filed: Mar. 31, 2016

(65) Prior Publication Data

US 2017/0282683 A1    Oct. 5, 2017

(51) Int. Cl.
*B60H 1/00*    (2006.01)

(52) U.S. Cl.
CPC ... *B60H 1/00521* (2013.01); *B60H 2001/006* (2013.01)

(58) Field of Classification Search
CPC .................................................. B60H 1/00521
USPC ........................................................ 454/160
See application file for complete search history.

(56) References Cited

U.S. PATENT DOCUMENTS

| | | | |
|---|---|---|---|
| 6,386,966 B1 | 5/2002 | Kuwayama et al. | |
| 6,622,787 B1* | 9/2003 | Toyoshima | B60H 1/00064 165/204 |
| 7,520,804 B2 | 4/2009 | Venkatappa et al. | |
| 8,029,344 B2* | 10/2011 | Thawani | B60H 1/00678 165/41 |
| 8,342,922 B2 | 1/2013 | Deneau et al. | |
| 2015/0038067 A1* | 2/2015 | Byon | B60H 1/00021 454/160 |

* cited by examiner

*Primary Examiner* — Steven B McAllister
*Assistant Examiner* — Allen Schult
(74) *Attorney, Agent, or Firm* — Harness, Dickey & Pierce, P.L.C.

(57) ABSTRACT

A heating, ventilation, and air cooling (HVAC) assembly including a blower, an air inlet, and a movable airflow obstruction member. The air inlet is defined by a housing. The blower receives airflow passing through the air inlet. The movable airflow obstruction member is movable to: a deployed position in which the airflow obstruction member is arranged to reduce airflow volume through the air inlet a first degree; a non-deployed position in which the airflow obstruction member is arranged to not reduce airflow volume through the air inlet; and an intermediate position in which the airflow obstruction member is arranged to reduce airflow volume through the air inlet a second degree that is less than the first degree.

9 Claims, 6 Drawing Sheets

NOISE PREVENTION DEVICES FOR HVAC ASSEMBLIES

FIELD

The present disclosure relates to noise prevention devices for heating, ventilation, and air cooling (HVAC) assemblies.

BACKGROUND

This section provides background information related to the present disclosure, which is not necessarily prior art.

Some heating, ventilation, and air cooling (HVAC) assemblies generate a rumble noise from the blower motor when the HVAC assembly is operated in certain modes, such as foot and defrost modes. The rumble noise may be the result of a high amount of back pressure causing some air to exit through a blower inlet when the HVAC assembly is in the foot and defrost modes. In other HVAC modes, such as a face mode, there may be no back pressure, and thus no rumble noise. While current HVAC assemblies are suitable for their intended use, they are subject to improvement. For example, it would be desirable and advantageous to at least: (1) prevent the rumble noise in HVAC modes where the noise occurs (e.g., the defrost and foot modes); and (2) not suppress airflow in HVAC modes where the rumble noise does not occur, such as the face mode. The present teachings provide for these advantages, as well as numerous others.

SUMMARY

This section provides a general summary of the disclosure, and is not a comprehensive disclosure of its full scope or all of its features.

The present teachings provide for a heating, ventilation, and air cooling (HVAC) assembly including a blower, an air inlet, and a movable airflow obstruction member. The air inlet is defined by a housing. The blower receives airflow passing through the air inlet. The movable airflow obstruction member is movable to: a deployed position in which the airflow obstruction member is arranged to reduce airflow volume through the air inlet a first degree; a non-deployed position in which the airflow obstruction member is arranged to not reduce airflow volume through the air inlet; and one or more intermediate positions in which the airflow obstruction member is arranged to reduce airflow volume through the air inlet a second degree that is less than the first degree.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
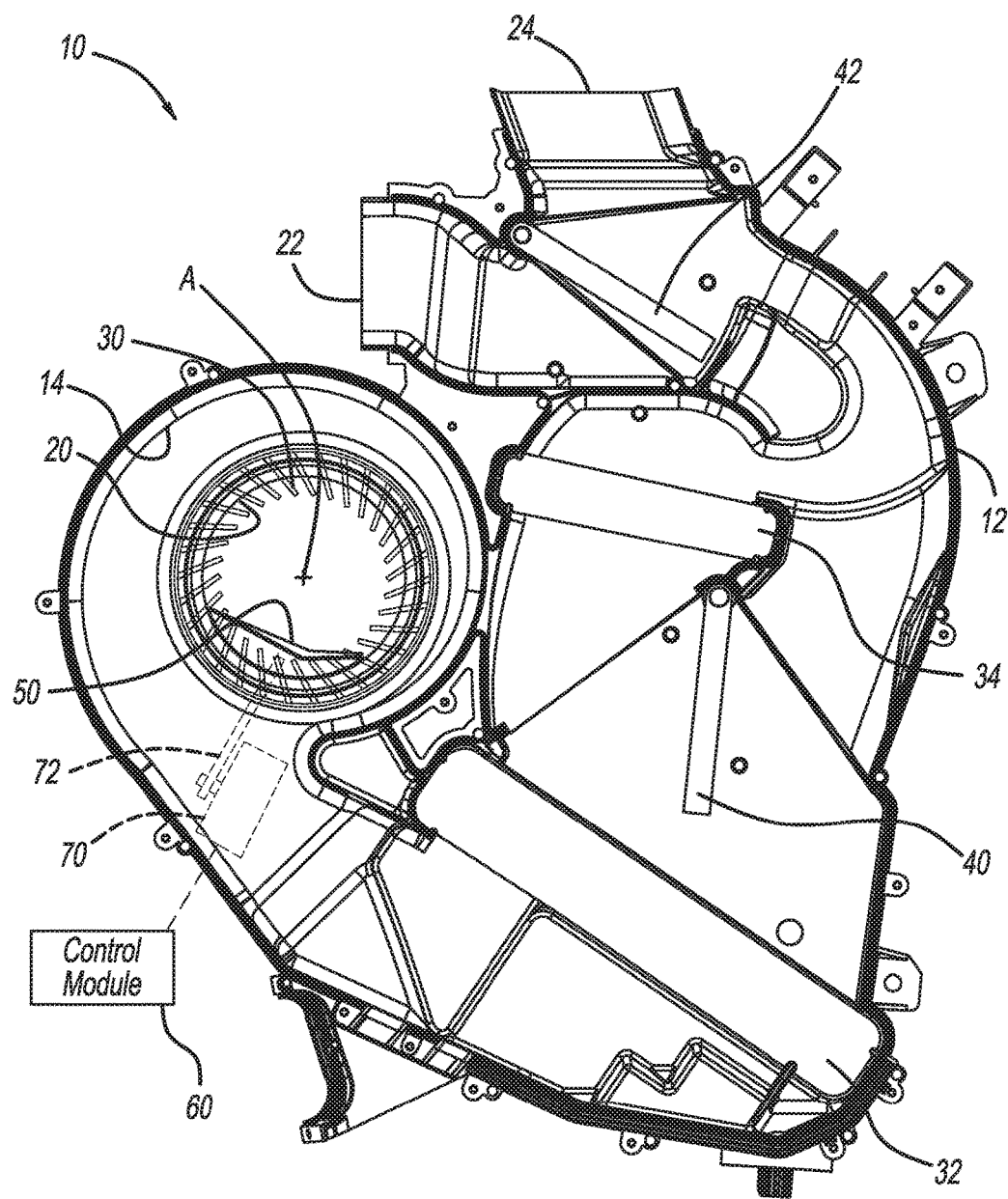
FIG. 1 is a cross-sectional view of a heating, ventilation, and air cooling (HVAC) assembly according to the present teachings.

With initial reference to FIG. 1, a heating, ventilation, and air cooling (HVAC) assembly according to the present teachings is illustrated at reference numeral 10. The HVAC assembly 10 is generally described herein as a vehicle HVAC assembly, but may be used in any other suitable manner. The HVAC assembly 10 can be used with any suitable vehicle, such as any suitable passenger vehicle, mass transit vehicle, military vehicle, construction vehicle, aircraft, or watercraft, for example. The HVAC assembly 10 may also be used with any suitable building HVAC system, such as that of a home, office, or any other structure.

The HVAC assembly 10 generally includes an HVAC case 12, which has a blower scroll 14. The HVAC case 12 defines an air inlet 20 at the blower scroll 14, a first outlet 22, and a second outlet 24. Any suitable number of outlets can be provided. The first and second outlets 22 and 24 may be coupled to any suitable air ducts to direct air out from within the HVAC case 12 to any suitable location. For example, the first outlet 22 can be coupled to an air duct arranged to direct heated airflow to a passenger cabin in order to heat the passenger cabin. The second outlet 24 can be connected to any suitable air duct arranged to direct airflow to a vehicle windshield in order to defrost the windshield.

The HVAC assembly 10 further includes a blower 30 arranged at the air inlet 20. The blower 30 can be any suitable blower, such as a rotary blower. The blower 30 is configured to draw air into the HVAC case 12 through the air inlet 20, and blow air through the HVAC case 12 such that the air exits the HVAC case 12 through the first or second outlets 22 and 24.

Mounted within the HVAC case 12 is an evaporator 32 and a heater core 34. The evaporator 32 can be any suitable evaporator configured to cool airflow passing therethrough when the evaporator 32 is activated. The heater core 34 can be any suitable heater core configured to heat airflow directed therethrough when the heater core 34 is activated.

Between the evaporator 32 and the heater core 34 is an air mix door 40. The air mix door 40 is movable to regulate the amount of airflow passing through the heater core 34. Proximate to the first and second outlets 22 and 24 is a mode door 42. The mode door 42 is movable to regulate airflow through the first and second outlets 22 and 24.

The HVAC assembly 10 further includes a control module 60. The control module 60 can be, or be part of, any suitable processor hardware (shared, dedicated, or group) that executes code, as well as memory hardware (shared, dedicated, or group) that stores code executed by the processor hardware. The code is configured to provide the features of the HVAC assembly 10 described herein.

For example, the control module 60 is configured to control the evaporator 32, the heater core 34, the air mix door 40, and/or the mode door 42, to operate the HVAC assembly 10 in a variety of different operational modes. The control module 60 is configured to operate the HVAC assembly 10 in a foot mode, for example, by deactivating the evaporator 32, arranging the air mix door 40 such that all or some airflow passes through the activated heater core 34, and arranging the mode door 42 such that airflow exits the HVAC case 12 through the first outlet 22, which can be a foot outlet. The control module 60 is further configured to operate the HVAC assembly 10 in a defrost mode in HVAC assemblies that include one or more defrost outlets by directing airflow passing through the activated heater core 34 to an outlet leading to the windshield. The control module 60 is further configured to operate the HVAC assembly 10 in a face mode. In the face mode, the mode door 42 is arranged so that airflow exits through the second outlet 24, which can be a face outlet. The temperature of the airflow through the outlet 24 is controlled by activating or deactivating the evaporator 32, and positioning the air mix door 40 to regulate the amount of airflow, if any, passing through the heater core 34. The HVAC assembly 10 can also operate in a bi-level mode, in which the mode door 42 is arranged at an intermediate position to direct airflow through both outlets 22 and 24.

The HVAC assembly 10 further includes a movable airflow obstruction member or rib 50. The airflow obstruction member 50 can be moved in any suitable manner between a deployed position, a non-deployed position, or any suitable intermediate position between the deployed and non-deployed positions. The airflow obstruction member 50 can have any suitable number of intermediate positions based on the number of intermediate modes provided by the HVAC assembly 10, or any other suitable HVAC assembly, as described herein. As illustrated in FIGS. 1 and 2A-2C, the airflow obstruction member 50 is movable by a servo motor 70, which rotates a support member or arm 72 supporting the airflow obstruction member 50. Specifically, the support member 72 extends from the servo motor 70, and the airflow obstruction member 50 is mounted to a distal end of the support member 72. The servo motor 70 can be any suitable motor, such as a dedicated servo motor. The servo motor 70 may also be configured to rotate one or both of the air mix door 40 and the mode door 42 in any suitable manner, such as by using any suitable linkage. The servo motor 70 rotates the airflow obstruction member 50 about rotational axis B, which extends generally perpendicular rotational axis A of the blower 30.

Figure 2A:
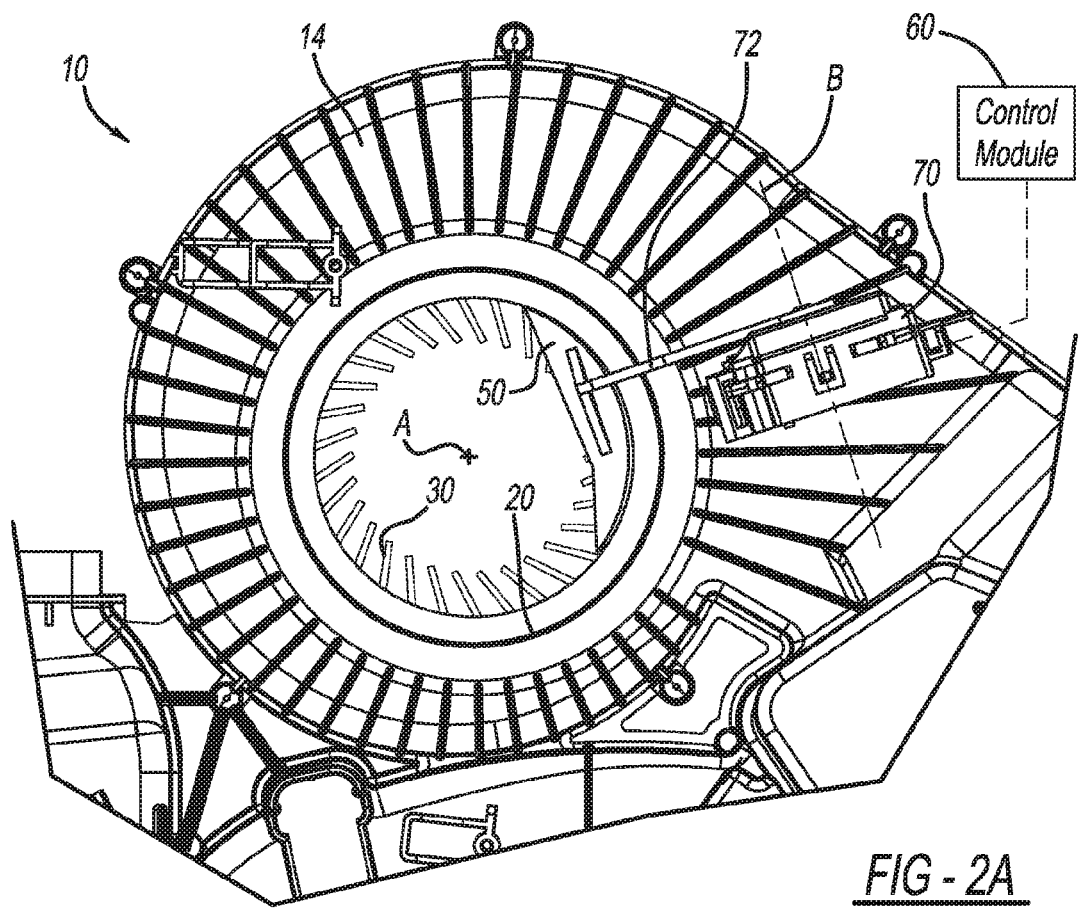
FIG. 2A is a plan view of a blower scroll of the HVAC assembly of FIG. 1, and an airflow obstruction member according to the present teachings arranged in a deployed position.

FIG. 2A illustrates the airflow obstruction member 50 in the deployed position. In the deployed position, the airflow obstruction member 50 is arranged at and within the air inlet 20 in order to effectively reduce the size of the air inlet 20, thereby reducing the airflow volume through the air inlet 20. The control module 60 is configured to position the airflow obstruction member 50 in the deployed position of FIG. 2A when the HVAC assembly 10 is in the foot mode. This advantageously reduces the volume of airflow that can exit the HVAC case 12 out through the air inlet 20 as a result of back pressure that is generated within the HVAC case 12 when the foot mode is activated. By reducing the airflow volume exiting through the air inlet 20, the rumble noise that may be generated in existing HVAC assemblies is reduced or eliminated.

Figure 2B:
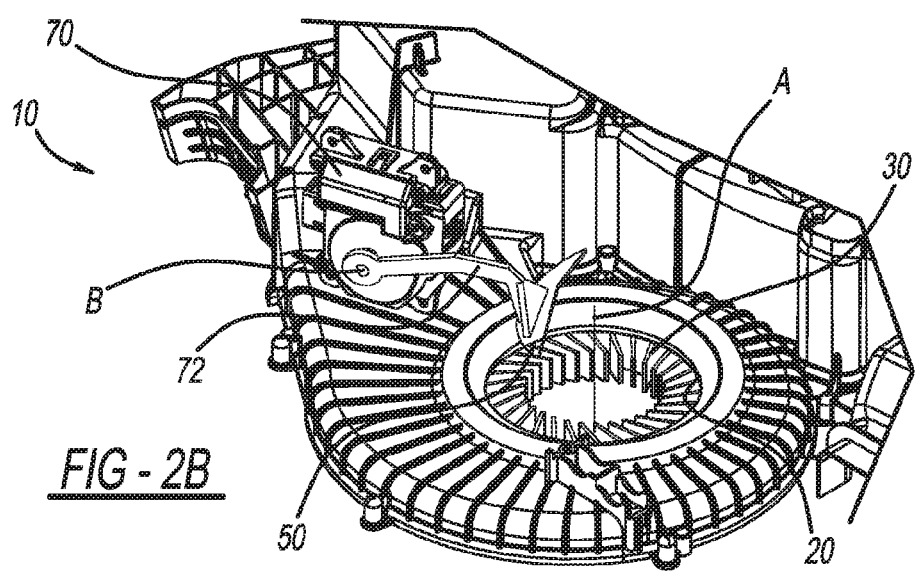
FIG. 2B is a perspective view of the blower scroll of the HVAC assembly of FIG. 1, and the airflow obstruction member arranged in an intermediate position.

FIG. 2B illustrates the airflow obstruction member 50 in the intermediate position. The control module 60 is configured to move the airflow obstruction member 50 to the intermediate position of FIG. 2B when the HVAC assembly 10 is placed in the defrost or the bi-level mode. In the intermediate position of FIG. 2B, the airflow obstruction member 50 reduces airflow through the air inlet 20, but to a lesser degree as compared to when the airflow obstruction member 50 is in the deployed position of FIG. 2A. In the intermediate position of FIG. 2B, the airflow obstruction member 50 advantageously reduces airflow volume in order to reduce or eliminate rumble noise, but allows more airflow into the HVAC case 12 as compared to the deployed position of FIG. 2A. Less back pressure is generated in the bi-level and defrost modes, thereby making it unnecessary to move the airflow obstruction member 50 to the deployed position of FIG. 2A to reduce or eliminate rumble noise. The airflow obstruction member 50 can be arranged at any suitable number of different intermediate positions, the number of which can correspond to the number of intermediate HVAC modes provided. For example, when the HVAC assembly 10 is provided with defrost modes, the airflow obstruction member 50 can include three different intermediate modes or positions, each one corresponding to a foot-defrost mode, a face-defrost mode, and a bi-level (face-foot mixture). These intermediate modes can be split further by varying the airflow distribution between modes, i.e., bi-level 1 mode, bi-level 2 mode, and bi-level 3 mode.

Figure 2C:
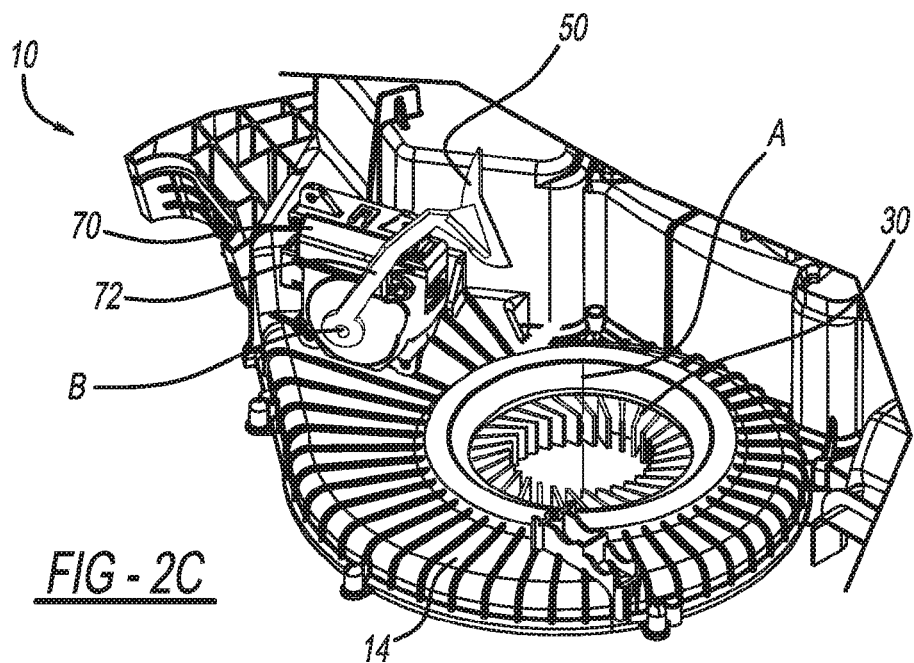
FIG. 2C is a perspective view of the blower scroll of the HVAC assembly of FIG. 1, and the airflow obstruction member arranged in a non-deployed position.

FIG. 2C illustrates the airflow obstruction member 50 in the non-deployed position. In the non-deployed position of FIG. 2C, the control module 60 rotates the airflow obstruction member 50 such that it does not obstruct airflow through the air inlet 20 at all. The control module 60 rotates the airflow obstruction member 50 to the non-deployed position of FIG. 2C when the HVAC assembly 10 is in the face mode, because in the face mode no back pressure is generated in the HVAC assembly 10 and thus no rumble noise is generated.

Figure 3A:
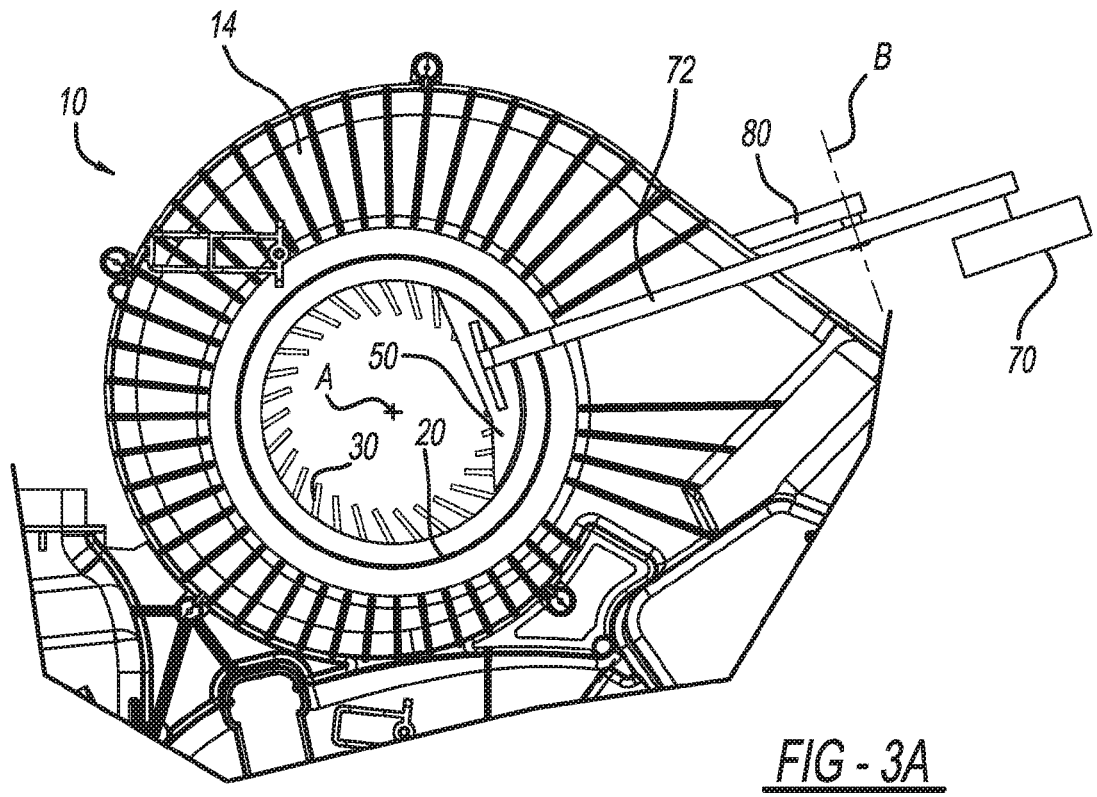
FIG. 3A is a plan view of the blower scroll of the HVAC assembly of FIG. 1, and another airflow obstruction member according to the present teachings arranged in a deployed position.
Figure 3B:
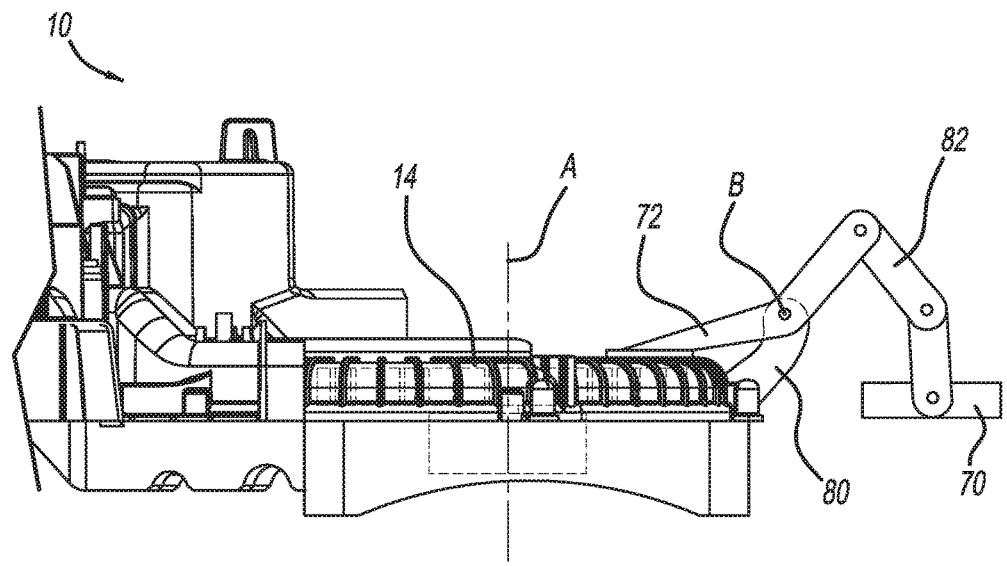
FIG. 3B is a side view of the airflow obstruction member of FIG. 3A in the deployed position.
Figure 4:
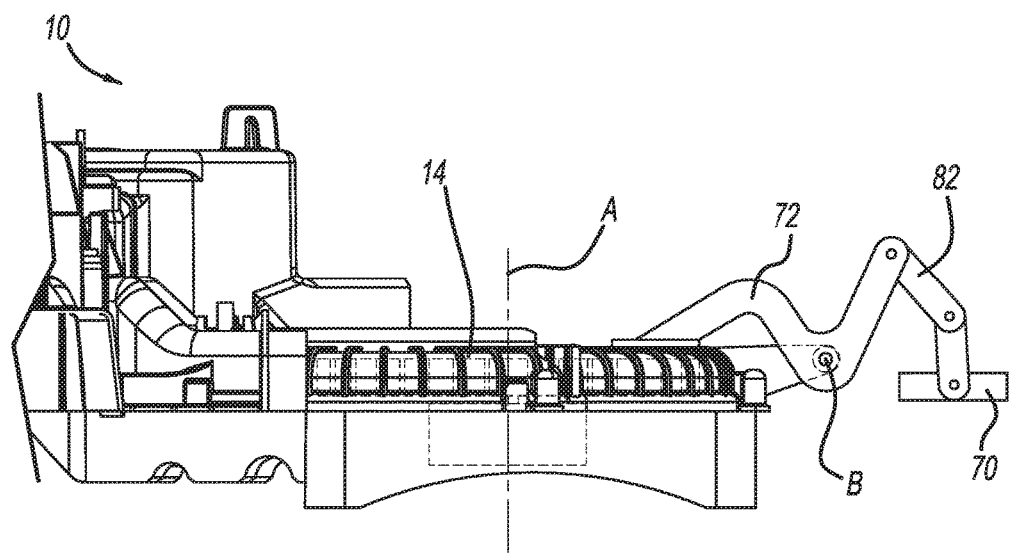
FIG. 4 is a side view of another airflow obstruction member according to the present teachings in a deployed position.

FIGS. 3A and 3B illustrate an additional assembly according to the present teachings for supporting and actuating the airflow obstruction member 50. As illustrated in FIGS. 3A and 3B, the support arm 72 supporting the airflow obstruction member 50 is coupled to a boss 80. The boss 80 is coupled to an exterior of the HVAC case 12, and to a linkage 82. The linkage 82 is coupled to the servo motor 70. Actuation of the servo motor 70 moves the linkage 82 to rotate the support arm about rotational axis B, which is where support arm 72 is coupled to the boss 80. With reference to FIG. 4, the boss 80 can be configured such that it extends generally perpendicular to the blower rotational axis A, and the support arm 72 can have a curved and lower profile, so as to advantageously take up less space. The linkage 82 can be any suitable linkage to connect the support arm 72 to the servo motor 70 so that activation of the servo motor 70 rotates the support arm 72 about rotational axis B.

Figure 5A:
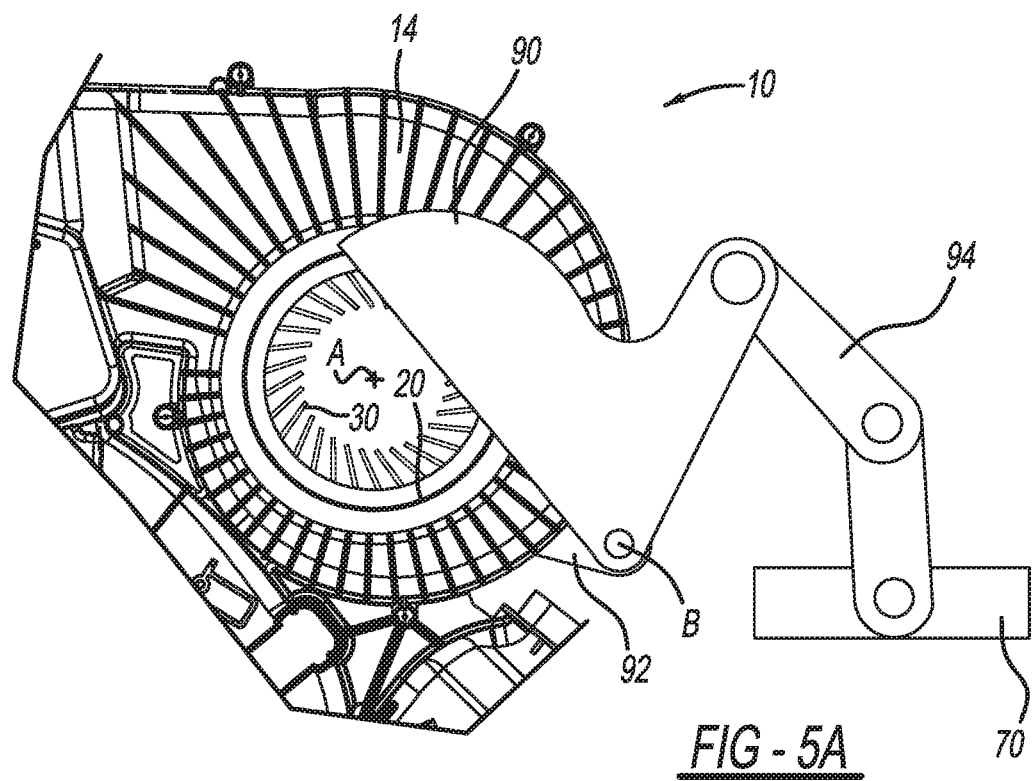
FIG. 5A is a plan view of an additional airflow obstruction member according to the present teachings arranged in a deployed position.
Figure 5B:
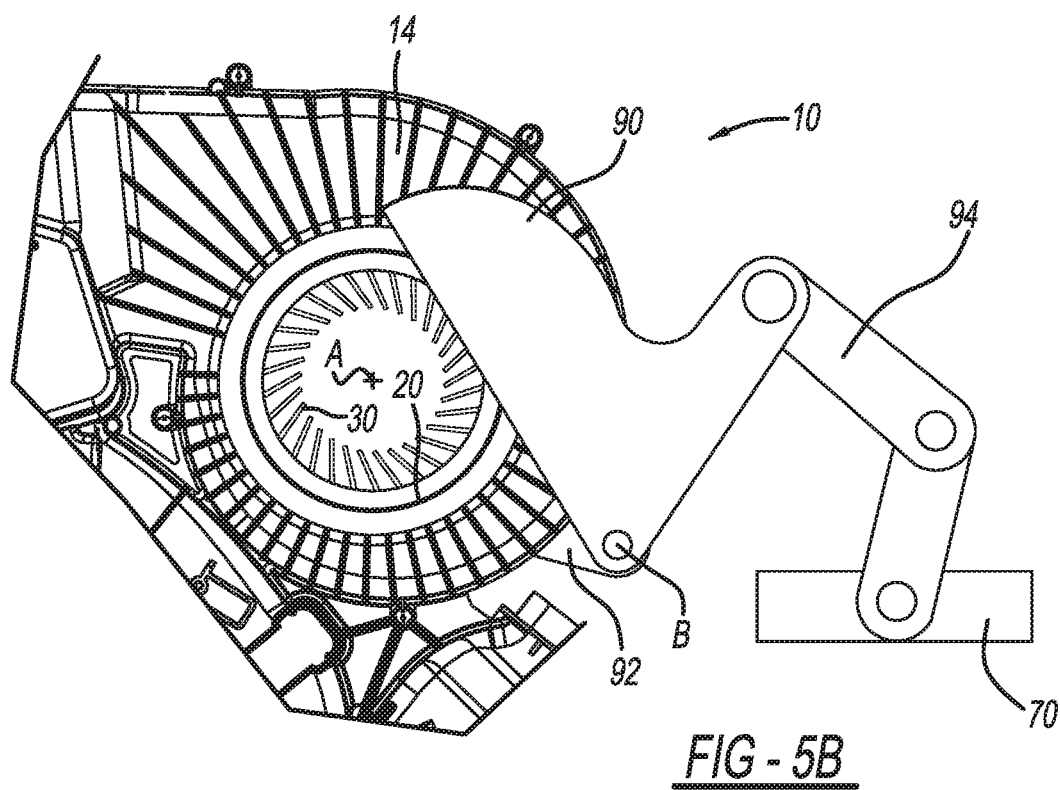
FIG. 5B is a plan view of the airflow obstruction member of FIG. 5A in an intermediate position.
Figure 5C:
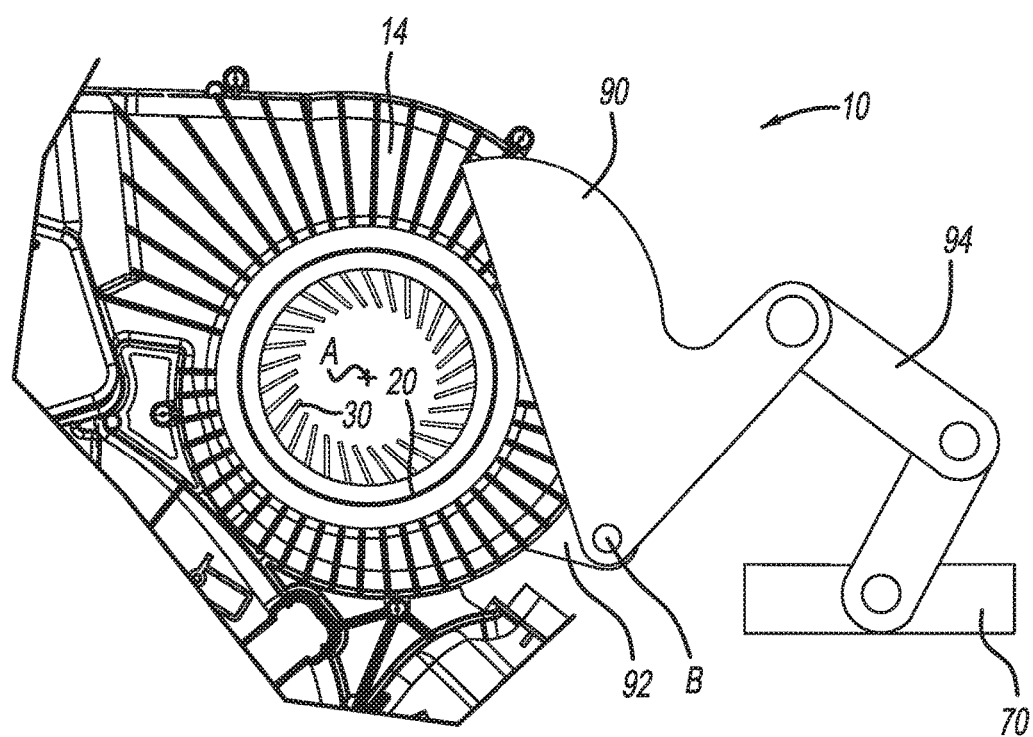
FIG. 5C is a plan view of the airflow obstruction member of FIG. 5A in a non-deployed position.

With additional reference to FIGS. 5A-5C, an additional airflow obstruction member according to the present teachings is illustrated at reference numeral 90. The airflow obstruction member 90 is mounted to boss 92 in any suitable manner to permit the airflow obstruction member 90 to rotate about axis B. The airflow obstruction member 90 is coupled to the servo motor 70 with linkage 94, which can be any suitable linkage for moving the airflow obstruction member 90 between the deployed position of FIG. 5A, the intermediate position of FIG. 5B, or the non-deployed position of FIG. 5C. The linkage 94 may be coupled to any other linkage for rotating one or both of the doors 40 and 42. Alternatively, the servo 70 can be a dedicated linkage for actuating the airflow obstruction member 90. As with the airflow obstruction member 50, the airflow obstruction member 90 is moved to the deployed position when the HVAC assembly is in the foot mode, is moved to the intermediate position of FIG. 5B when the HVAC assembly 10 is in the bi-level and defrost modes, and is moved to the non-deployed position of FIG. 5C when the HVAC assembly 10 is in the face mode.

The present teachings thus advantageously deploy the airflow obstruction members 50 and 90 only to an extent sufficient to reduce rumble noise, and therefore permit maximum airflow through the air inlet 20 while still preventing rumble noise. When the airflow obstruction members 50 and 90 are not needed to prevent rumble noise, the present teachings advantageously allow the airflow obstruction members 50 and 90 to be positioned so as to not reduce airflow volume through the air inlet 20 and into the HVAC case 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air cooling (HVAC) assembly comprising:
    a blower;
    an air inlet defined by a housing, the blower receives airflow passing through the air inlet; and
    a movable airflow obstruction member that is movable to: a deployed position in which the airflow obstruction member is arranged against the air inlet to reduce airflow volume through the air inlet a first degree; a non-deployed position in which the airflow obstruction member is arranged spaced apart from the air inlet to not reduce airflow volume through the air inlet; and an intermediate position in which the airflow obstruction member is arranged to reduce airflow volume through the air inlet a second degree that is less than the first degree;
    wherein the air inlet has a first area when the movable airflow obstruction member is in the non-deployed position and spaced apart from the air inlet; and
    wherein the air inlet has a second area that is smaller than the first area when the movable airflow obstruction member is in the deployed position and arranged against the air inlet a controller configured to:

arrange the movable airflow obstruction member in the deployed position when the HVAC assembly is in a foot mode;

arrange the movable airflow obstruction member in the non-deployed position when the HVAC assembly is in a face mode; and arrange the movable airflow obstruction member in the intermediate position when the HVAC assembly is in a defrost mode or a bi-level mode.

2. The HVAC assembly of claim 1, wherein the blower is a rotary blower.

3. The HVAC assembly of claim 1, wherein the air inlet is circular.

4. The HVAC assembly of claim 1, wherein the movable airflow obstruction member includes a movable rib.

5. The HVAC assembly of claim 1, wherein the movable airflow obstruction member is movable to the deployed position, the non-deployed position, and the intermediate position by a dedicated servo motor, the intermediate position is any one of a plurality of intermediate positions between the deployed and non-deployed positions.

6. The HVAC assembly of claim 1, further comprising a movable mode door; and
a servo motor configured to move the movable mode door and the movable airflow obstruction member.

7. The HVAC assembly of claim 1, wherein:
the movable airflow obstruction member is arranged in the deployed position when the HVAC assembly is in the foot mode;
the movable airflow obstruction member is arranged in the non-deployed position when the HVAC assembly is in the face mode; and
the movable airflow obstruction member is arranged in the intermediate position when the HVAC assembly is in the defrost mode or the bi-level mode.

8. The HVAC assembly of claim 1, wherein the movable airflow obstruction member rotates about a rotation axis extending parallel to a blower rotational axis of the blower.

9. The HVAC assembly of claim 1, wherein the movable airflow obstruction member rotates about a rotation axis extending perpendicular to a blower rotational axis of the blower.

* * * * *

UNITED STATES PATENT AND TRADEMARK OFFICE
CERTIFICATE OF CORRECTION

PATENT NO. : 10,093,148 B2
APPLICATION NO. : 15/086781
DATED : October 9, 2018
INVENTOR(S) : Zachary Schmitt Page 1 of 1

It is certified that error appears in the above-identified patent and that said Letters Patent is hereby corrected as shown below:

In the Claims

Column 6, Line 67, In Claim 1, after "inlet", insert --;¶--

Signed and Sealed this
Twenty-first Day of May, 2019

Andrei Iancu
*Director of the United States Patent and Trademark Office*